United States Patent [19]

Haas

[11] Patent Number: 5,331,351

[45] Date of Patent: Jul. 19, 1994

[54] WIDE-SCREEN PICTURE INDICATION SIGNAL DETECTOR FOR A TELEVISION RECEIVER

[75] Inventor: Kenneth J. Haas, Indianapolis, Ind.

[73] Assignee: Thomson Consumer Electronics, Inc., Indianapolis, Ind.

[21] Appl. No.: 9,301

[22] Filed: Feb. 10, 1993

[51] Int. Cl.[5] ............................................... H04N 5/46
[52] U.S. Cl. ...................................... 348/558; 348/556
[58] Field of Search ..................... 358/188, 140, 11; 348/554, 555, 556, 558, 474; H04N 5/46

[56] References Cited

U.S. PATENT DOCUMENTS

| | | | |
|---|---|---|---|
| 4,385,324 | 5/1983 | Shioda et al. | 358/180 |
| 4,394,690 | 7/1983 | Kobayashi | 348/556 |
| 4,897,722 | 1/1990 | Flory | 358/141 |
| 5,029,007 | 7/1991 | Spiero | 358/11 |
| 5,136,369 | 8/1992 | Bohme et al. | 348/558 |

FOREIGN PATENT DOCUMENTS

| | | | |
|---|---|---|---|
| 0261971 | 10/1989 | Japan | H04N 3/223 |
| 4280182A | 10/1992 | Japan | H04N 5/46 |

Primary Examiner—Mark R. Powell
Assistant Examiner—Jeffrey S. Murrell
Attorney, Agent, or Firm—Joseph S. Tripoli; Peter M. Emanuel; Thomas F. Lenihan

[57] ABSTRACT

A VCR or laserdisc player includes circuitry for detecting a code provided by VCR tapes, tape cassettes, or laser videodiscs, which indicates that the material recorded on the videotape or videodisc has been recorded in a compressed fashion to enable proper playback on a 16×9 television receiver. In response to detection of this code, the VCR or laserdisc player applies a DC signal to the chrominance output terminal of its S-Video connector. Circuitry in the television receiver detects the DC signal on the chrominance terminal of its S-Video input connector, and controls a wide-screen processor to expand the image by displaying it over the entire width of the 16×9 display screen.

3 Claims, 2 Drawing Sheets

WIDE-SCREEN PICTURE INDICATION SIGNAL DETECTOR FOR A TELEVISION RECEIVER

FIELD OF THE INVENTION

This invention concerns television receivers which may play television pictures previously recorded in widescreen (i.e., 16 by 9 aspect ratio) format.

BACKGROUND OF THE INVENTION

NTSC television instruments having 16×9 aspect ratio picture tubes and format converters to convert 4×3 aspect ratio NTSC signals to a form suitable for display on a 16×9 display are now available. It therefore becomes desirable to have VCR tapes that play back signals electrically in the NTSC format but which were optically produced in a 16×9 aspect ratio. These signals may be produced by special lenses or by 16×9 CCD imagers. U.S. Pat. No. 4,897,722 (Flory), entitled WIDESCREEN TELEVISION TRANSMISSION SYSTEM UTILIZING CONVENTIONAL EQUIPMENT INCLUDING A CAMERA AND VCR, issued Jan. 30, 1990 (herein incorporated by reference), discloses a system in which a conventional NTSC format video camera utilizes an anamorphic lens to optically produce images in a 16×9 aspect ratio. That is, the anamorphic lens compresses the image horizontally by a factor of 4/3, which is the exact amount needed to compensate for the expansion of a 4×3 aspect ratio NTSC image by a factor of 4/3 which automatically occurs when it is displayed on a wider 16×9 aspect ratio display screen.

If a such an optically-compressed NTSC video signal is played back to a standard 4×3 television receiver, the image would appear correct in height, but compressed in width, or "skinny". However, as noted above, a horizontal expansion of 4×3 aspect ratio signals occurs automatically when these signals are displayed on a 16×9 aspect ratio display screen because the time to scan a single horizontal line in both aspect ratios is the same. In other words, the same amount of video data is spread out over a greater distance in the same amount of time as the electron beam scans across the longer distance of the 16×9 aspect ratio display screen.

Unfortunately, if a standard 4×3 image is displayed on a 16×9 display screen, the same automatic horizontal expansion takes place, making everything appear "fatter". In order to prevent this undesirable display, the 4×3 image is typically displayed on the 16×9 display screen in its proper 4×3 aspect ratio, by displaying blank vertical bars on each side of the 4×3 image to fill up the remainder of the 16×9. International patent application PCT/ US91/03746, filed May 29 1991, published as WO 91/19397 on Dec. 12, 1991, (Willis), entitled SYNCHRONIZING SIDE BY SIDE PICTURES, (herein incorporated by reference) discloses a system in which a 4×3 image is "speeded up" to enable the video data to be read out at a faster rate and avoid the appearance of stretching.

Clearly, a 16×9 aspect ratio television receiver should be able to properly display the optically-compressed 16×9 NTSC signals over the entire expanse of the wide-screen, and properly display the 4×3 video signals in a 4×3 aspect ratio with accompanying blank vertical bars. A problem exists in that an optically-generated 16×9 compressed NTSC video signal is indistinguishable from a standard 4×3 NTSC video signal, because it is the image content of the signal which changes; not its format which is the standard NTSC format in both cases. Thus, there is no way to examine the video signal stream and automatically direct the television receiver which way to display the image (i.e., 16×9, or 4×3 with blank bars).

SUMMARY OF THE INVENTION

A VCR or laserdisc player includes circuitry for detecting a code provided by VCR tapes, tape cassettes, or laser videodiscs, which indicates that the material recorded on the videotape or videodisc has been recorded in a compressed fashion to enable proper playback on a 16×9 television receiver. In response to detection of this code, the VCR or laserdisc player applies a DC signal to the chrominance output terminal of its S-Video connector. Circuitry in the television receiver detects the DC signal on the chrominance terminal of its S-Video input connector, and controls a wide-screen processor to expand the image by displaying it over the entire width of the 16×9 display screen.

DETAILED DESCRIPTION OF THE DRAWING

Figure 1:
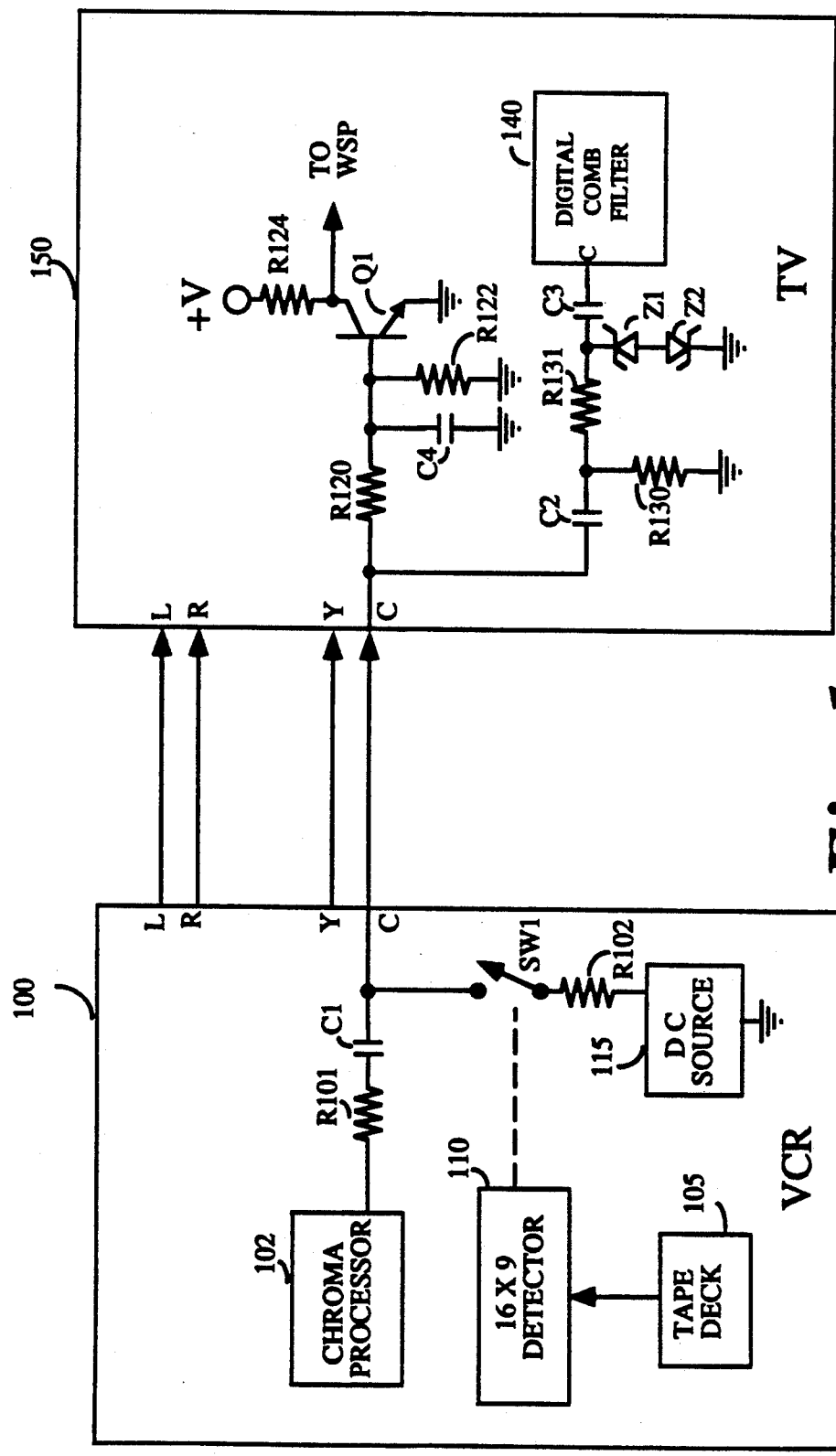
FIG. 1 is a simplified block diagram of a portion of a VCR and a portion of a television receiver according to the invention.

Referring to FIG. 1, a VCR 100 is coupled to a television receiver 150 via stereo audio signal lines L and R, and by an S-video cable including a line Y for conveying luminance information, and a line C for conveying chrominance information of a baseband television video signal.

Figure 2A:
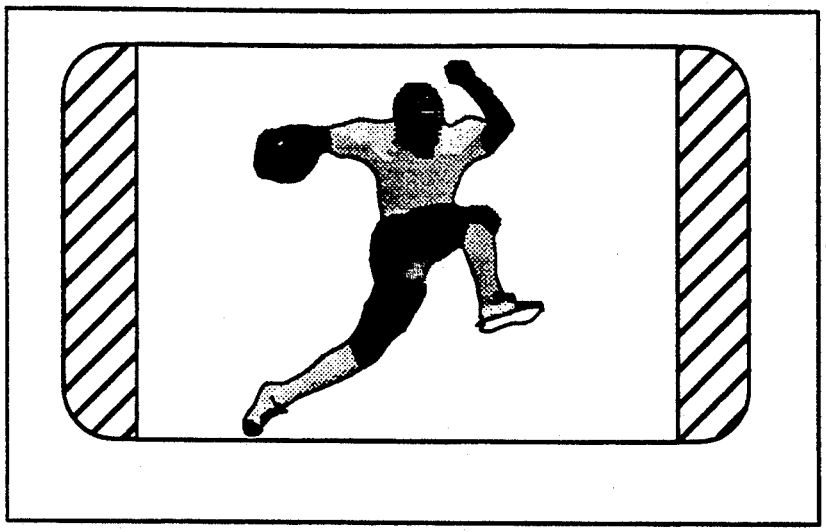
FIGS. 2a, 2b, and 2c illustrations of television image displays helpful in understanding the invention.
Figure 2B:
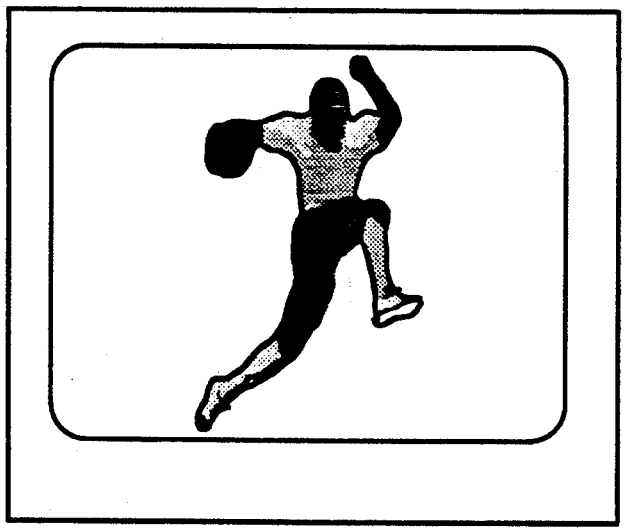
Figure 2C:
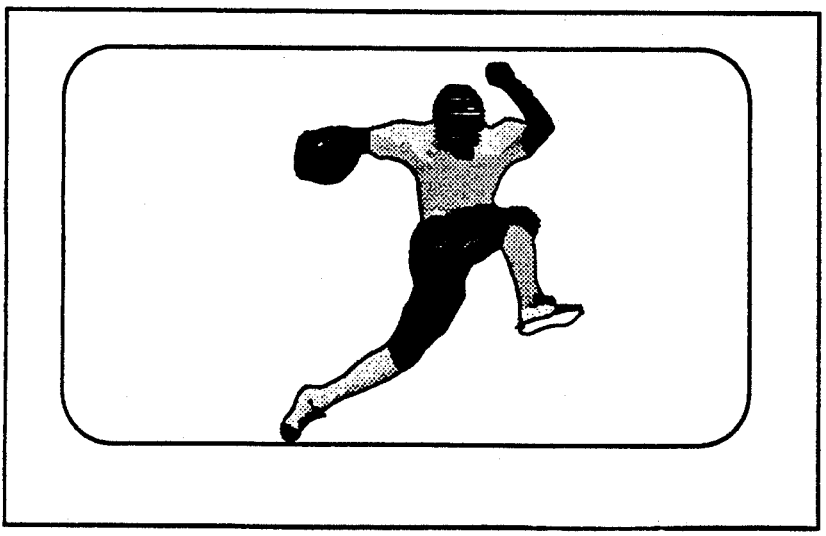

FIG. 2a is an illustration of a widescreen television receiver displaying a standard 4×3 television image flanked by blanked vertical side bars to fill up the remainder of the widescreen display area. It is desirable that television receiver 150 be capable of displaying 4×3 image information, received from VCR 100, in this manner. FIG. 2b is an illustration of a horizontally optically-compressed video image as it would appear if displayed on a standard 4×3 aspect ratio display screen, and is provided simply as an aid in visualizing the effect on a video image of the use of the above-mentioned anamorphic lens. FIG. 2c is an illustration of the same horizontally optically-compressed video image as it would appear if displayed on a 16×9 aspect ratio display screen. Note that the image is automatically stretched horizontally by exactly the same amount with which it was compressed, resulting in an undistorted image. This automatic stretching is due to the fact that the 16×9 aspect ratio display screen is wider that the 4×3 aspect ratio image by exactly 4/3. Some indication must be provided to the television receiver that the image is uncompressed and is to be displayed according to FIG. 2a, or that the image is optically (or digitally) horizontally compressed and should be expanded by displaying it across the entire screen as shown in FIG. 2c.

Circuitry for providing such an indication is shown in FIG. 1. Assume that a videotape which is prerecorded with optically (or digitally) horizontally-compressed video signals is inserted into the tape deck 105 of VCR 100 for playback. A code indicating the fact that the currently-inserted videotape is prerecorded with optically (or digitally) horizontally-compressed video signals (hereinafter referred to as "widescreen NTSC" signals) may be recorded on the tape. Alternatively, the videotape cassette may be modified in some fashion, such as forming a hole in it, such that mechanical engagement with, or failure to engage, a switch may provide the information that the tape is prerecorded with widescreen NTSC signals.

A 16×9 aspect ratio detector 110 detects the information that the tape is prerecorded with widescreen NTSC signals, and closes a switch SW1 which applies a DC level of approximately 5 volts, via a current limiting resistor R102, to the chrominance terminal C of the output S-video connector of the VCR. Chrominance signals recovered from the playback of the videotape are applied to the same terminal from a chroma processor 102, via source resistance R101 and capacitor C1. Capacitor C1 serves two functions; it couples high frequency signals to the output terminal, and decouples the DC widescreen NTSC indication signal from chroma processor 102.

Television receiver 150 includes circuitry to detect presence of the DC widescreen NTSC indication signal. The DC level is applied via a voltage divider comprising resistors R120 and R122 to the base of a switching transistor Q1. Transistor Q1 is arranged in a common emitter configuration and has a collector resistor R124 which is chosen to allow saturation to occur even if the incoming DC level is as low as 2.5 volts. The signal developed at the collector of Q1 is applied to a widescreen processor circuit WSP (not shown) for changing the mode of display to that of FIG. 2c in response to a high level signal at the collector of Q1, or to that of FIG. 2a in response to a high level signal at the collector of Q1. Capacitor C4 is a filter capacitor for removing any vestiges of the chrominance signal from the base of transistor Q1.

The DC widescreen NTSC signal is blocked from the color processing circuitry by capacitor C2 which presents a high impedance to DC signals. Capacitor C2 presents a low impedance (near zero ohms) to AC signals at the frequencies of the chrominance component of the S-video signal. Resistor R130 is a 75 ohm termination resistor for properly terminating the chrominance line. Resistor R131 is a low value resistor which together with back-to-back zener diodes Z1 and Z2 provides voltage spike protection to Digital Comb Filter 140. Capacitor C3 prevents the 75 ohm termination resistor from pulling down the DC restoration within digital comb filter 140. The values for capacitors C2 and C3 were chosen to provide flat group delay and amplitude response for the chrominance band frequencies.

Preferably, the DC widescreen NTSC indication signal conforms to the following specifications.

1. A DC voltage applied to the chrominance output of the S-Video connector.

2. The DC voltage is in the range of 5 volts, +0/−2.5 volts.

3. The output impedance of the DC signal source is 10 kilohms, +/−3 kilohms.

4. The DC impedance of the detector circuit at the S-video input of the receiver is at least 100 kilohms.

Suitable values for the components of FIG. 1 are:

| | |
|---|---|
| R101 = 75 ohms | R102 = 10 kilohms |
| R120 = 100 kilohms | R122 = 56 kilohms |
| R124 = 56 kilohms | R130 = 75 ohms |
| R131 = 51 ohms | Z1 = Z2 = 6.8 volt zener diodes |
| C1 = 0.1 microfarads | C2 = 0.1 microfarads |
| C3 = 1500 picofarads | C4 = 0.1 microfarads |

What is claimed is:

1. A television receiver having a luminance input terminal and a chrominance input terminal for receiving separate luminance (Y) and chrominance (C) component signals of a video signal from a VCR playing a prerecorded videotape, said television receiver comprising:
   a widescreen display screen;
   said chrominance input terminal for receiving said chrominance component signal of said video signal, also receiving an indicator signal for indicating that said prerecorded video tape contains images which have been optically horizontally compressed;
   filter means coupled to said chrominance input terminal for coupling said indicator signal to an output and substantially decoupling said chrominance component signal from said output;
   means coupled to said output of said filter means for receiving and detecting said indicator signal; and
   means for causing said image to be displayed across the entire width of said widescreen display screen in response to the detection of said indicator signal.

2. The system of claim 1, wherein:
   said indicator signal is a DC signal and said means for detecting detects said DC signal.

3. A television receiver, comprising:
   a widescreen display screen;
   an S-Video input connector including a luminance input terminal for receiving a luminance (Y) signal component, and a chrominance input terminal for receiving a chrominance (C) component signal of a video signal from a VCR playing a prerecorded videotape;
   said chrominance input terminal also receiving a DC signal when said prerecorded video tape contains images which have been optically horizontally compressed;
   lowpass filter means coupled to said chrominance input terminal for separating said DC signal from said chrominance component signal;
   a control circuit responsive to said DC signal for causing said image to be expanded across the entire width of said widescreen display screen.

* * * * *